United States Patent [19]

Speidel et al.

[11] Patent Number: 4,825,285
[45] Date of Patent: Apr. 25, 1989

[54] HYBRID ENCODER

[75] Inventors: Joachim Speidel, Nuremberg; Peter Vogel, Diepersdorf, both of Fed. Rep. of Germany

[73] Assignee: U.S. Philips Corporation, New York, N.Y.

[21] Appl. No.: 38,809

[22] Filed: Apr. 15, 1987

[51] Int. Cl.4 .............................................. H04N 7/12
[52] U.S. Cl. .................................... 358/133; 358/135; 358/136; 382/56; 375/27; 364/725
[58] Field of Search ...................... 358/133, 135, 136; 375/27; 382/56; 364/725

[56] References Cited

U.S. PATENT DOCUMENTS

| | | | |
|---|---|---|---|
| 4,051,530 | 9/1977 | Kuroda et al. | 358/136 |
| 4,093,994 | 6/1978 | Nussbaumer | 364/725 |
| 4,245,248 | 1/1981 | Netravali et al. | 358/136 |
| 4,281,344 | 7/1981 | Mounts et al. | 358/136 |
| 4,460,923 | 7/1984 | Hirano et al. | 358/136 |
| 4,700,226 | 10/1987 | Acampora | 358/136 |
| 4,706,260 | 11/1987 | Fedele et al. | 358/133 |

OTHER PUBLICATIONS

"Group Theory and Its Application to the Quandum Mechanics of Atomic Spectra", Wigner et al., 1959, pp. 1-30.
"Digital Image Processing", Pratt, 1987, pp. 242-247.

Primary Examiner—James J. Groody
Assistant Examiner—John K. Peng
Attorney, Agent, or Firm—Edward W. Goodman

[57] ABSTRACT

In the hybrid encoder for video signals described the picture elements of a video picture are arranged into equally large data blocks and each newly entered data block, is compared with a data block of the previous video picture by means of a subtractor (SR). The data blocks of the previous picture are stored in a picture store (BS). In order to maintain the transmission bit rates as small as possible, the data blocks are conventionally subjected to a transformation (for example, a Fourier transformation) (F) and a subsequent quantization (Q). For the required strong bit rate reduction a rough quantization is necessary, which leads to a strong quantization noise. To eliminate the quantization noise a blockwise adaptive low-pass filtering (T,FTI) is performed in two signal paths of the hybrid encoder. The quantizer (Q) may then have a refined design or it may be omitted altogether. The result of the low-pass filtering (T,FTI) is a low-definition video picture which is, however, free from the occasionally occurring picture distortions caused by the quantization noise.

10 Claims, 3 Drawing Sheets

HYBRID ENCODER

BACKGROUND OF THE INVENTION

The invention relates to a hybrid encoder for video signals in which the picture elements of a video picture are arranged into equally large data blocks, each data block being compared with the corresponding data block of the previous video picture by means of a subtractor and the corresponding data block of the previous video picture being derived from a picture store, the difference block obtained by means of the subtractor traversing a first processing circuit which subjects the difference block to a matrix transformation and in which this transformation is inversed in a feedback path by a second processing circuit with the inverse matrix and the regained difference block is applied to a first input of an adder while data blocks from the picture store are applied to the second input of the adder and the output of the adder is connected to the data input of the picture store.

A hybrid encoder as featured above is known from a conference report of the COST group (draft version document Sim 85/78 Report COST 211-bis Simulation Subgroup Meeting, Stockholm, 10–11 December 1985). A circuit diagram of the known hybrid encoder is shown in FIG. 1. The main purpose of the encoder is to transcode the video data from a video data source with a possibly small loss of information into a signal having a possibly small bit rate. In this process two encoding principles—hence the name hybrid encoder—are used: The interframe principle in which the correlation between temporally successive video pictures (this designation is used for frames and fields in this respect) is utilized and the intraframe principle in which the correlation of the video data within a video picture is utilized.

Before the actual encoding process the data must be preprocessed. This operation is effected by a pre-processing unit PP in the hybrid encode of FIG. 1. The data are applied to the encoder in blocks. Such a video data block comprises the data of given pixels of a video picture which are considered as elements of a quadratic matrix (for the significance of the terms used in connection with matrices, compare Wigner, E. P.: Group Theory; Academic Press New York and London 1959, pages 1–30). For example, a data block may consist of the chrominance values of the first eight pixels of the first eight lines of a video picture. Each video picture is split up into equally large data blocks by the pre-processing unit PP. In this process each data block has a given identification. The data block herein described as an example may be symbolized and characterized, for example by $b_{11}$. Data blocks of successive video pictures which have the same identification are designated as corresponding data blocks.

Such a designation should also refer to data blocks of successive video pictures whose information contents are identical as much as possible. Data blocks corresponding to one another in this respect play a role in hybrid encoders in which a so-called block matching process is performed. However, this hybrid encoder variant will not be further described.

When applying a data block, for example the data block $b_{11}$ to an input of a subtractor SR the corresponding data block—designated by, for example $b_{11}$—of the previous video picture is simultaneously applied from a picture store BS to the other input of the subtractor SR. The subtractor SR derives the difference between the two blocks in the sense of the difference between two matrices (compare Wigner, page 7); this difference block is then subjected to further operations.

A first processing circuit F performs on each difference block a transformation in the sense of a matrix transformation (compare Wigner, page 9). If a is the symbol for the transformation matrix of the circuit F and $d_{11}$ is the symbol for the matrix of the difference block—or more simply for the difference block—the block $D_{11} = a^{-1}d_{11}a$ is present after the transformation at the output of the circuit F, in which $a^{-1}$ is the symbol for the matrix which is inverse to a. The transformation by the circuit F approximately corresponds to the Fourier transformation (more precisely, a special two-dimensional Fourier transformation is concerned) in the acoustic signal transmission; the block $D_{11}$ can generally be encoded with fewer binary digits than the block $d_{11}$.

Subsequently the transformed signal transverses a quantizer Q which ensures another data reduction. In order that the overal signal can be transmitted with a constant bit rate to a receiver, a buffer store P is provided. A multiplexer MUX interlaces the useful signal read from the buffer store P with control information which in the relevant case serve inter alia for adjusting a quantizer at the receiver end (an adaptive quantizer is meant here). After the quantization the signal is also fed back via a feedback path to the input of the hybrid encoder. Initially the block $D_{11}$ modified by the quantizer Q is regenerated by a regeneration unit (not shown) to such an extent that it corresponds to the original block $D_{11}$, but for round-off errors. It is then transformed by a second processing circuit IF with the transformation matrix $a^{-1}$ into the difference block $d_{11}$ again (likewise disregarding round-off errors). Due to the connection of an output A of the picture store BS to an input of an adder AR, the adder AR adds to this block the prior data block $b_{11}$ from which the difference block $d_{11}$ was formed by the subtractor SR. Possible delays due to finite processing times are either compensated by delay members or phase differences of control clock pulses (both of which are not shown in FIG. 1).

As can be easily ascertained, the replacing data block $b_{11}$ is present at the output of the adder AR (round-off errors are not taken into account) of the video picture supplied via the pre-processing unit PP. This data block is entered into the picture store BS via an input E and takes over the role of the prior data block $b_{11}$ which is now erased.

In the known hybrid encoder the bit rate reduction is dependent on the construction of the quantizer Q. If the quantizing intervals are large, this also applies to the bit rate reduction, than the picture quality is reduced in a particularly disturbing manner by the high quantization errors. For example, a chess-board pattern may be visible on the display screen, which is the result of the split-up of a video picture in blocks, or permanently changing structures (artifacts) are produced and disappear again which may lead to a complete distortion of the displayed picture.

In order to reduce the quantization error at least for sensitive signal portions, for example adaptive quantizers are used, i.e quantizers whose characteristic is varied by the video signal. The design is elaborate inter alia because additional information about the state of the quantizer is to be transmitted to the receiver.

SUMMARY OF THE INVENTION

It is an object of the invention to provide a hybrid encoder of the type described in the opening paragraph in which a reduction of the transmission bit rate is possible without an increase of quantization errors.

This object is realized in that the first processing circuit is succeeded by a third processing circuit which performs a matrix operation having a low-pass character on the transformed blocks of the first processing circuit and in that a fourth processing circuit is arranged between the said output of the picture store and the second input of the adder, which fourth processing circuit performs a matrix operation which has the same effect as the successively performed matrix operations of the first, third and second processing circuits.

Advantageous embodiments of the invention, as well as other solutions to the object of the invention are described in the appended claims.

The invention is based on the recognition that—analogously to the acoustic case—a bandwidth-limited signal having a small bit rate can be transmitted through a given channel. The limitation of the frequency bandwidth of the video signal is noticeable as a picture lacking definition on the display screen. Such a lack of definition is, however, less disturbing than the above-mentioned disturbances caused by quantization errors.

BRIEF DESCRIPTION OF THE DRAWINGS

The invention will now be described in greater detail by way of example with reference to the accompanying drawings in which.

In all Figures units having the same function are denoted by the same reference numerals.

DETAILED DESCRIPTION OF THE INVENTION

Figure 1:
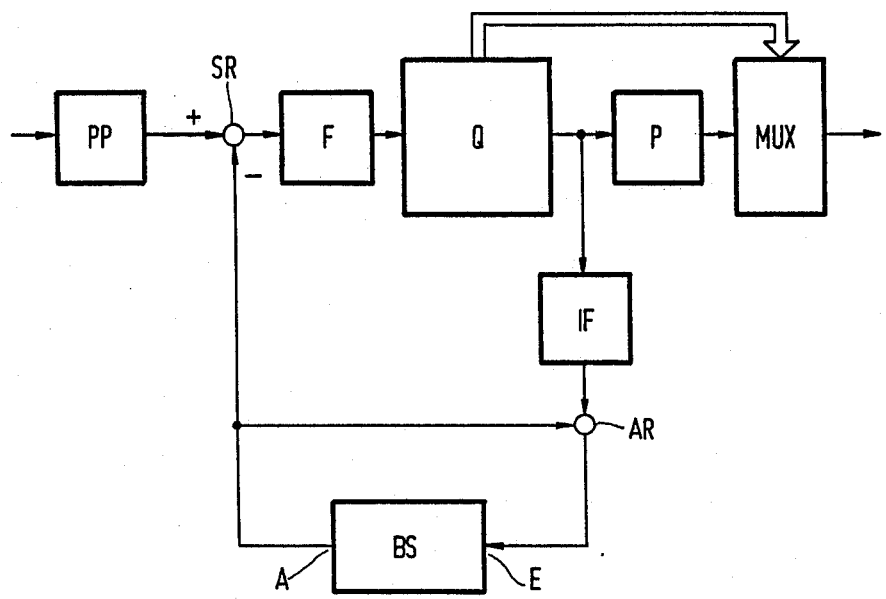
FIG. 1 shows a hybrid encoder according to the prior art and FIGS. 2, 3 and 4 show hybrid encoders having the characteristic features according to the invention.

FIG. 1 has been extensively described in the opening paragraph so that this Figure need not be further referred to.

Figure 2:
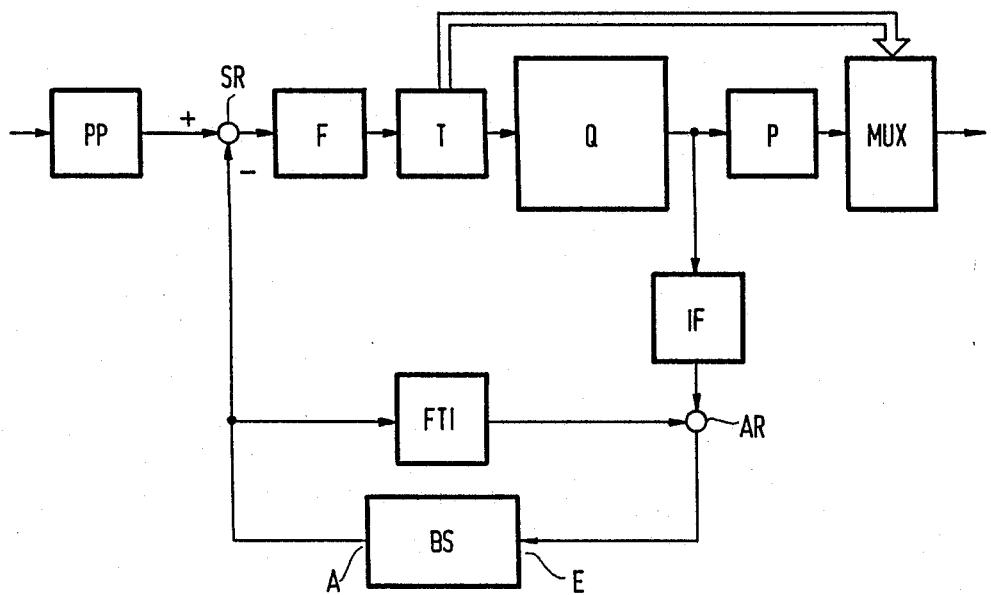

FIG. 2 is distinguished from FIG. 1 only by two processing circuits, namely T and FTI. The reference symbols for the othe units are identical to those of FIG. 1. The processing circuit T is arranged between the processing circuit F and the quantizer Q, while the processing circuit FTI distorts the output signal of the picture store BS in the manner described below and then applies it to an input of the adder AR.

For the purpose of further explanation it has been assumed for the sake of simplicity that the data block $b_{11}$ is applied to the subtractor SR via the pre-processing unit PP, while simultaneously the data block $b_{11}$ is present at the output A of the picture store BS. The subtractor SR then forms the difference block $d_{11} = b_{11} - b_{11}$ which is transformed by the circuit F into the block $D_{11} = a^{-1}d_{11}a$. The circuit T having a matrix h forms the block $h'a^{-1}d_{11}ah$ therefrom in which $h'$ is the transposed matrix of h (compare Wigner, page 23). A matrix operation having a low-pass character is performed with the matrix h; this will be further explained hereinafter. But for possible quantization errors (rounding-off errors) the last block reaches the processing circuit IF which performs a transformation which is inverse to the transformation of the circuit F, which means that now the block $ah'a^{-1}d_{11}aha^{-1}$ appears at the output of the circuit IF. Due to the circuit FTI whose matrix is initially denoted w, the block $w'b_{11}w$ is added by the adder AR to the block at the output of the circuit IF. If w is chosen to be $aha^{-1}$, the block $ah'a^{-1}b_{11}aha^{-1}$ is present at the output of the adder AR. As can easily be checked, the operation of the processing circuit FTI on a block with this choice of w is the same as the successively performed operations of the circuits F, T and IF. It is to be noted that the matrix a is an orthogonal matrix (compare Wigner, page 24).

The significance of the formulae given so far is obvious: A low-pass filtering of the blocks transformed by the circuit F is performed with the matrix h in circuit T and the same filtering of the non-transformed blocks is performed with the matrix w in circuit FTI. The low-pass filtering by means of the circuits T and FTI is thus performed in different "domains" namely in the spatial domain by the circuit FTI and in the frequency domain by the circuit T. Due to these distinct "domains" the transformation matrices—as explained above—are also different for the circuits T and FTI so that different matrices are to be calculated and stored.

The low-pass filtered blocks are entered into the picture store BS and thus a low-definition picture is stored and also transmitted. This low definition is the price which is to be paid for suppressing the quantization errors.

If the cut-off frequency in connection with the low-pass filtering by the matrix h is low enough, the quantizer Q may be, for example a non-adaptive quantizer or it may be dispensed with altogether if the bit rates are small enough.

In the further description it is assumed that the processing circuit F performs a cosine transformation by means of the matrix a (compare, for example Pratt, W. K.: Digital Image Processing; John Wiley & Sons 1978, pages 242-247). Such a matrix a is known in all its details to those skilled in the art. For this special case a very simple filter matrix, namely a diagonal matrix (compare Wigner, page 8), can be used for the matrix h. Filter matrices which perform a filtering of the blocks in the spatial domain (period) formally have the same structure as the following auxiliary matrix m:

$$m = \begin{bmatrix} 110 & \ldots & 0 \\ 1010 & \ldots & 0 \\ 01010 & \ldots & 0 \\ \cdot & & \cdot \\ \cdot & & \cdot \\ \cdot & & \cdot \\ 0 & \ldots & 101 \\ 0 & \ldots & 011 \end{bmatrix}$$

From the second line of the matrix m three elements—here 1, 0, 1, —are shifted one position to the right with each further line; all further elements of the lines are zero. The first two elements of the first line and the last two elements of the last line consist of the digit one, whereas all other elements consist of the digit zero. The line number of the matrix m (it corresponds to the column number) is as large as the line number or column number of the blocks to be processed.

If as matrix w the matrix $$w = kI + \frac{(1-k)}{2} m$$

is chosen with I as a unitary matrix, this results for k, which is smaller than 1 but larger than or equal to 0.5, in a whole class of filter matrices having a low-pass character. The smaller k, the lower the cut-off frequency during low-pass filtering. Each power of w also results in a matrix with a low-pass character.

If the above-mentioned relation between w and h is solved for h, a diagonal matrix results for $h = a^{-1}wa$ insofar as the matrix a satisfies the above-mentioned conditions. Each power of w also leads to a diagonal matrix h.

Low-pass filtering can be refined in that the matrices h and w are changed in dependance upon the signal so that the filtering is performed adaptively. However, in that case additional informtion should be transmitted to the receiver for the purpose of decoding. This transmission of additional information is designated, for example, by a connection of the circuit T to the multiplexer MUX. The same connections exist also between the other circuits having a low-pass effect and the multiplier MUX, but they are not shown. The adjustment of, for example the cut-off frequencies of the circuits having a low-pass effect is dependent on the filling level of the buffer store P and on the so-called displacement vector which is a quantity denoting the distinction between successive video pictures based on the movement of the recorded objects and which is also determined by the picture store BS (denoted by the connection of the unit PP to the picture store BS). Data about the filling level of the buffer store P and the magnitude of the displacement vector are also transmitted to the receiver for the purpose of appropriate decoding.

Figure 3:
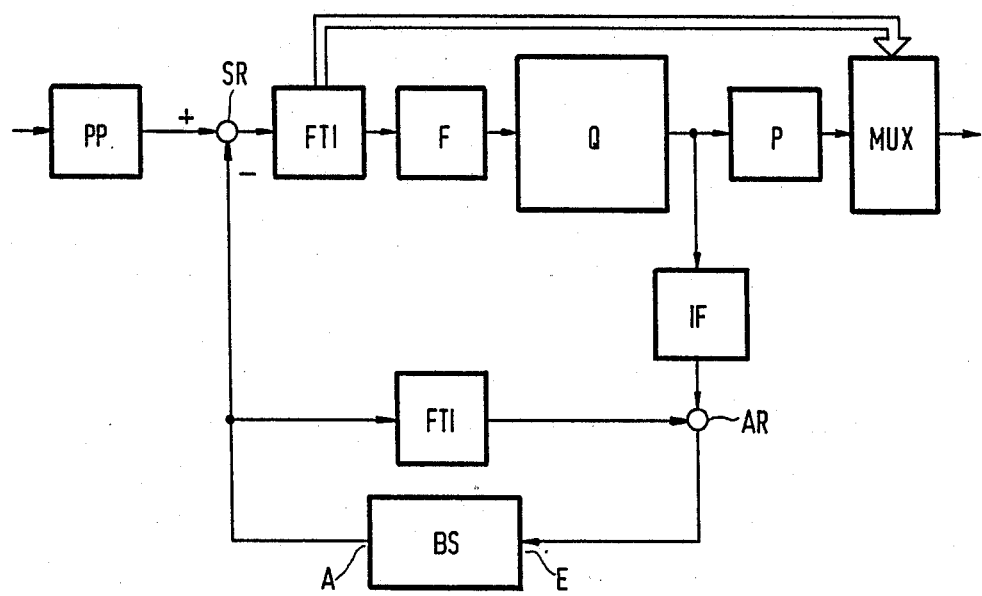

A variant of the hybrid encoder of FIG. 2 is shown in FIG. 3. In this variant the matrix transformation with a low-pass character is first performed by a processing circuit FTI at the output of the subtractor SR and subsequently the transformation of the difference blocks is performed in the frequency domain with the circuit F. The processing circuit FTI at the output of the subtractor SR performs the low-pass filtering in the spatial domain likewise as the second circuit FTI which transforms the data blocks from the picture store BS and applies them to the adder AR. This variant has the advantage that two identical circuits FTI can be used in the hybrid encoder and consequently, for example only one transformation matrix needs to be stored.

A further variant (not shown) having the same advantage is a variant in which in a circuit according to FIG. 2 the processing circuit F performing the Fourier transformation of the data blocks immediately follows the unit PP and thus applies already transformed blocks to the subtractor SR. In that case a further circuit T is to be arranged at the location of the circuit FTI while the unit IF is omitted. In the loop signals in the frequency domain only are processed in this manner.

Figure 4:
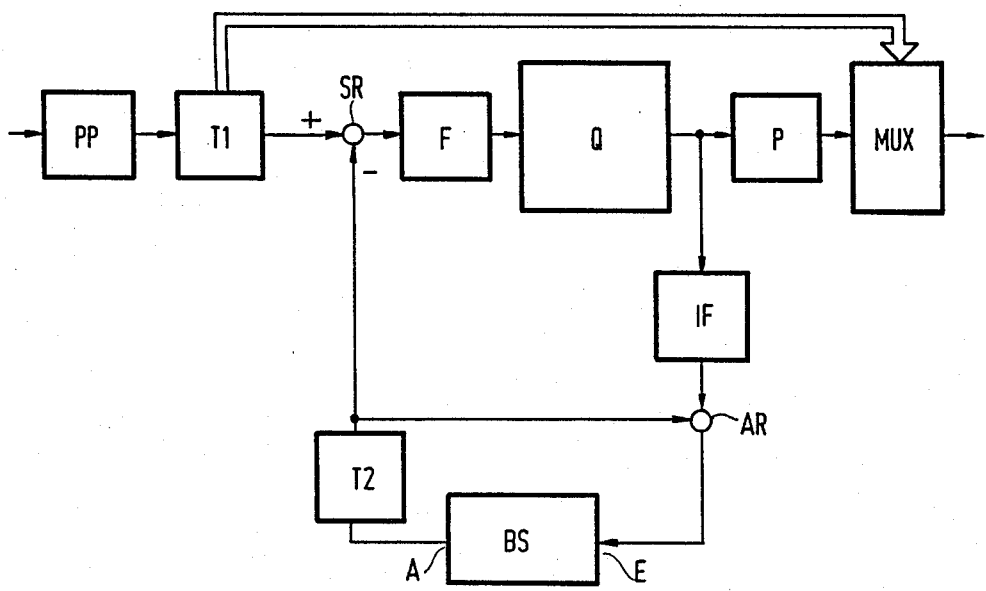

According to FIG. 4 the low-pass filtering of the blocks of the video signal is performed by a circuit T1 before the subtraction by the subtractor SR. A further circuit T2 immediately follows the output of the picture store BS. The two circuits T1 and T2 perform the low-pass filtering in the spatial domain and thus comprise matrices which correspond formally to the above given matrix w or powers thereof.

The adjustment or control of the cut-off frequencies of the circuits T1 and T2 is initially performed in such a way—as is also the case for the other variants having two low-pass circuits—that corresponding data blocks are filtered equally; thus the cut-off frequencies are the same for the two low-pass circuits.

In the variant according to FIG. 4 a further improvement of the quality of the transmitted pictures can be achieved without raising the transmission bit rate if the low-pass effect of the circuit T1 is smaller than the low-pass effect of the circuit T2. A smaller low-pass effect involves, for example a higher cut-off frequency; the low-pass effect of a unit becomes zero when the cut-off frequency becomes infinitely high. Also in the case of a control of the cut-off frequencies of the circuits T1 and T2, for example by the displacement vector, the cut-off frequency of the circuit T1 should always be chosen to be higher than the cut-off frequency of the circuit T2.

It should now be made plausible that with such a dimensioning of the circuits T1 and T2 an improvement of the picture quality is obtained in contrast to the case in which the two circuits are equally dimensioned. For this purpose it is initially assumed that the two circuits T1 and T2 are inoperative and thus have infinitely high cut-off frequencies. For the further reasoning the following empirically established fact is significant: If the above-mentioned spatial two-dimensional Fourier transformation is performed with the data blocks from the unit PP and if the same transformation is performed with the data blocks from the picture store BS, then it can be determined that there is only a small correlation between the coefficients which are associated with the higher frequencies and the data blocks which correspond to each other. The high frequency components of the blocks from the unit PP are thus statistically independent of the high frequency components of the data blocks from the picture store BS. However, since the subtractor SR forms the difference between the two blocks and the difference block is Fourier-transformed by the circuit F, values which are higher than those for each block separately result for the high frequency components of the difference blocks. Therefore, the high frequency components of the blocks from the picture store BS are attenuated by the circuit T2 which has now a finite cut-off frequency. Consequently, the picture quality at the receiver end is improved, whilst picture components which are unsuitable for encoding at the transmitter end are not longer used. This leads inter alia to a smaller number of bits required for encoding the difference blocks.

Independently thereof, a band limitation of the signal to be encoded is performed by the processing circuit T1. This is to be carried out in such a way that the cut-off frequency of the circuit T1 operating as a low-pass filter is higher than the cut-off frequency of the circuit T2. The band limitation of the blocks from the unit PP reduces the disturbing quantization noise at the expense of the definition of the picture; this drawback is, however, less disturbing The low-pass characteristic of the circuit T2 is determined both from the correlation degree between the coefficients of the blocks from the unit PP and from the picture store BS, and from the low-pass characteristic of the circuit T1.

Figure 5:
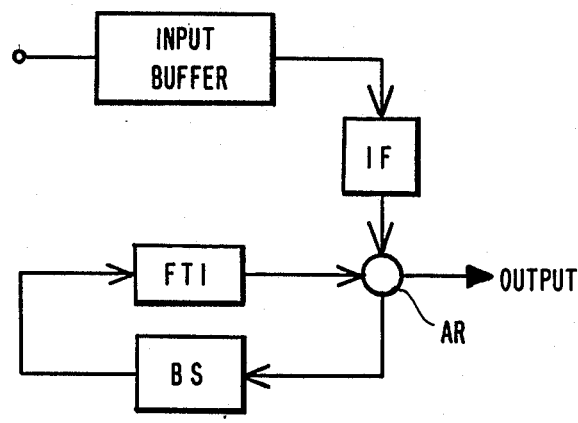
FIG. 5 shows a hybrid decoder circuit for encoded signals produced by the encoder in either FIG. 2 or FIG. 3.

At the receiver end the blocks are decoded in a way similar to the decoding operations performed by the decoder in the hybrid encoder. A hybrid decoder according to the invention essentially consists of a part of the corresponding hybrid encoder. A hybrid decoder comprises all circuits which are arranged in the feedback loop of the corresponding hybrid encoder. FIG. 5 shows a decoder variant of the encoder according to FIG. 2 or FIG. 3. The hybrid decoder comprises an input buffer store and a circuit IF for retransformation of the data blocks in the spatial domain, an adder AR, a picture store BS and a processing circuit FTI for filtering; all these units are connected together in the same way as the corresponding units of the hybrid encoder of FIG. 2 or FIG. 3. The output of the adder AR at the receiver end is also the output of the hybrid decoder. The blocks connected thereto are subjected to a post-treatment which essentially involves the dissolvement of the block structure in order that the signal can be visualized on a monitor as a sequence of video pictures.

Figure 6:
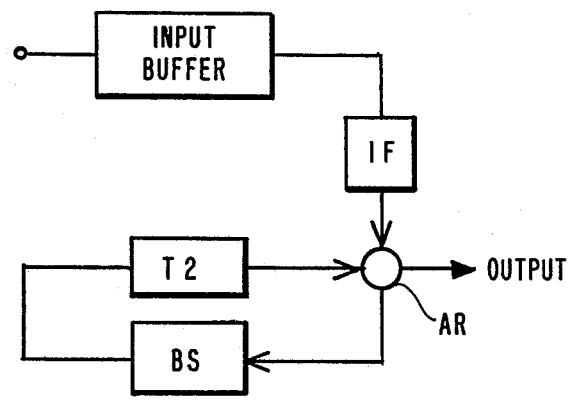
FIG. 6 shows a hybrid decoder circuit for encoded signals produced by the encoder in FIG. 4.

The same applies to the hybrid decoder in FIG. 6, which is the decoder variant of the encoder in FIG. 4.

We claim:

1. A hybrid encoder for encoding video signals which represent picture elements of a video picture and which are arranged in equally large data blocks, each data block being compared with the corresponding data block of the previous video picture by means of a subtractor and the corresponding data block of the previous video picture being derived from a picture store; a difference block being obtained by the subtractor and supplied to a first processing circuit (F) which subjects said difference block to a matrix transformation, such transformation being inversed in a feedback path by a second processing circuit (IF) with the inverse matrix to regain said difference block; the regained difference block being applied to a first input of an adder and data blocks from the picture store being applied to a second input of the adder, the output of the adder being connected to the data input of the picture store; characterized in that the first processing circuit (F) is succeeded by a third processing circuit (T) which performs a matrix transformation having a low-pass character on the transformed blocks from the first processing circuit (F) and in that a fourth processing circuit (FTI) is arranged between the output (A) of the picture store (BS) and the second input of the adder (AR); said fourth processing circuit performing a matrix transformation which has the same effect as the successively performed matrix operations of the first (F), third (T) and second (IF) processing circuits.

2. A hybrid encoder as claimed in claim 1, wherein the matrices of the third (T) and fourth (FTI) processing circuits are adaptively varied in dependence on the video signals to be encoded.

3. A hybrid encoder as claimed in claim 1, wherein the third processing circuit (T) which performs the matrix operations having a low-pass character, the matrix is a diagonal matrix, and a cosine transformation is performed in the matrix transformation of the first processing circuit (F).

4. A hybrid encoder as claimed in claim 3, wherein the matrices of the third (T) and fourth (FTI) processing circuits are adaptively varied in dependence on the video signals to be encoded.

5. A hybrid encoder for encoding video signals which represent picture elements of a video picture and which are arranged in equally large data blocks, each data block being compared with the corresponding data block of the previous video picture by means of a subtractor and the corresponding data block of the previous video picture being derived from a picture store; a difference block being obtained by the subtractor and supplied to a first processing circuit (F) which subjects said difference block to a matrix transformation, such transformation being inversed in a feedback path by a second processing circuit (IF) with the inverse matrix to regain said difference block; the regained difference block being supplied to a first input of an adder and data blocks from the picture store being supplied to a second input of the adder, the output of the adder being connected to the data input of the picture store; characterized in that a third processing circuit (FTI) is arranged between the subtractor (SR) and the first processing circuit (F), said third processing circuit performing a matrix transformation having a low-pass character on each data block prior to transformation thereof in processing circuit (F); and a fourth processing circuit (FTI) is arranged between the output (A) of the picture store (BS) and the second input of the adder (AR), said fourth processing circuit also performing a matrix transformation having a low pass character and which is identical to the transformation performed by said third processing circuit.

6. A hybrid encoder as claimed in claim 5 further comprising a buffer store (P) for said regained difference block, and wherein the low-pass matrix transformation performed by the third and fourth processing circuits have cut-off frequencies which are changed in dependence upon the filling level of such buffer store.

7. A hybrid encoder for encoding video signals which represent picture elements of a video picture and which are arranged in equally large data blocks, each data block being compared with the corresponding data block of the previous video picture by means of a subtractor and the corresponding data block of the previous video picture being derived from a picture store; a difference block being obtained by the subtractor and supplied to a first processing circuit (F) which subjects said difference block to a matrix transformation, such transformation being inversed in a feedback path by a second processing circuit (IF) with the inverse matrix to regain said difference block; the regained difference block being supplied to a first input of an adder and data blocks from the picture store being supplied to a second input of the adder, the output of the adder being connected to the data input of the picture store; characterized in that a third processing circuit (T1) is arranged between the subtractor (SR) and the first processing circuit (F) which performs a matrix transformation having a low-pass character on each data block before comparison in the subtractor (SR); and a fourth processing circuit (T2) also performing a matrix transformation having a low-pas character is arranged immediately behind the output (A) of the picture store (BS).

8. A hybrid encoder as claimed in claim 7, wherein the low-pass effect of the third processing circuit (T1) which is arranged between said subtractor (SR) and the first processing circuit (F) is smaller than the low-pass effect of the fourth processing circuit (T2) which filters the data blocks from the picture store.

9. A hybrid encoder as claimed in claim 7, further comprising a buffer store (P) for said regained difference block and wherein the low-pass matrix transformation performed by the third and fourth processing circuits have cut-off frequencies which are changed in dependence upon the filling level of such buffer store.

10. A hybrid decoder for decoding video signals which are encoded by a hybrid encoder as claimed in any of claims 1, 5, or 7, and which present picture elements of a video picture arranged in equally large data blocks; such decoder comprising an input buffer memory for receiving such data blocks and a processing circuit for subjecting such data block to a matrix transformation identical to that performed by the second processing circuit (IF) of the hybrid encoder, an output of the processing circuit of said decoder being connected to a first input of an adder, a second input of the adder being connected to an output of a picture store (BS) which is functionally the same as the picture store of the hybrid encoder, the output of the adder being connected to the input of said picture store (BS); characterized in that a further processing circuit is arranged between the output of the picture store (BS) and said second input of the adder, such further processing circuit performing a matrix transformation having a low-pass character on the data blocks at the output of the picture store (BS) identical to the matrix transformation having a low-pass character performed by the fourth processing circuit (FT1 or T2) of the hybrid encoder.

* * * * *

UNITED STATES PATENT AND TRADEMARK OFFICE
CERTIFICATE OF CORRECTION

PATENT NO. : 4,825,285
DATED : April 25, 1989
INVENTOR(S) : SPEIDEL ET AL

It is certified that error appears in the above-identified patent and that said Letters Patent is hereby corrected as shown below:

Please add the following abstract

ABSTRACT OF THE DISCLOSURE

In the hybrid encoder for video signals described the picture elements of a video picture are arranged into equally large data blocks, and each newly entered data block is compared with a data block of the previous video picture by means of a subtractor (SR). The data blocks of the previous picture are stored in a picture store (BS). In order to maintain the transmission bit rates as small as possible, the data blocks are conventionally subjected to a transformation (for example, a Fourier transformation) (F) and a subsequent quantization (Q). For the required strong bit rate reduction a rough quantization is necessary, which leads to a strong quantization noise. To eliminate the quantization noise a blockwise adaptive low-pass filtering (T,FTI) is performed in two signal paths of the hybrid encoder. The quantizer (Q) may then have a refined design or it may be omitted altogether. The result of the low-pass filtering (T,FTI) is a low-definition video picture which is, however, free from the occasionally occurring picture distortions caused by the quantization noise.

Signed and Sealed this

Nineteenth Day of December, 1989

*Attest:*

JEFFREY M. SAMUELS

*Attesting Officer*   *Acting Commissioner of Patents and Trademarks*